United States Patent [19]

Carter et al.

[11] 4,008,899
[45] Feb. 22, 1977

[54] SEAL FOR PERMITTING TRANSFER OF TAPE FROM ONE PRESSURE REGION TO A REGION OF SUBSTANTIALLY DIFFERENT PRESSURE

[75] Inventors: H. Kennon Carter; Ronald L. Mlekodaj, both of Oak Ridge, Tenn.

[73] Assignee: The United States of America as represented by the United States Energy Research and Development Administration, Washington, D.C.

[22] Filed: Jan. 27, 1976

[21] Appl. No.: 647,678

[52] U.S. Cl. .................................. 277/135
[51] Int. Cl.² .................................. F16J 15/40
[58] Field of Search .................. 277/237, 135; 118/48–49.5, 405

[56] References Cited
UNITED STATES PATENTS

| | | | |
|---|---|---|---|
| 2,215,449 | 9/1940 | Alexander et al. | 277/135 |
| 2,291,248 | 7/1942 | Myers | 277/135 |
| 2,622,041 | 12/1952 | Godley | 118/49 |
| 3,392,700 | 7/1968 | Mallory | 118/405 |
| 3,668,905 | 6/1972 | Schlunke | 118/48 |

*Primary Examiner*—Robert I. Smith
*Attorney, Agent, or Firm*—Dean E. Carlson; David S. Zachry; David E. Breeden

[57] ABSTRACT

A seal is provided for allowing a thin flexible tape to be pulled from a high vacuum region (less than $10^{-6}$ torr) into atmospheric pressure. The tape first passes through a slit in an elastomer and thence through a pool of vacuum pump fluid into a differentially pumped volume. A second slit in an elastomer is the final seal element prior to exit of the tape to atmospheric pressure. The vacuum seal is utilized in a system for the rapid removal of samples, implanted in the surface of the tape, from a vacuum system to atmospheric pressure.

2 Claims, 1 Drawing Figure

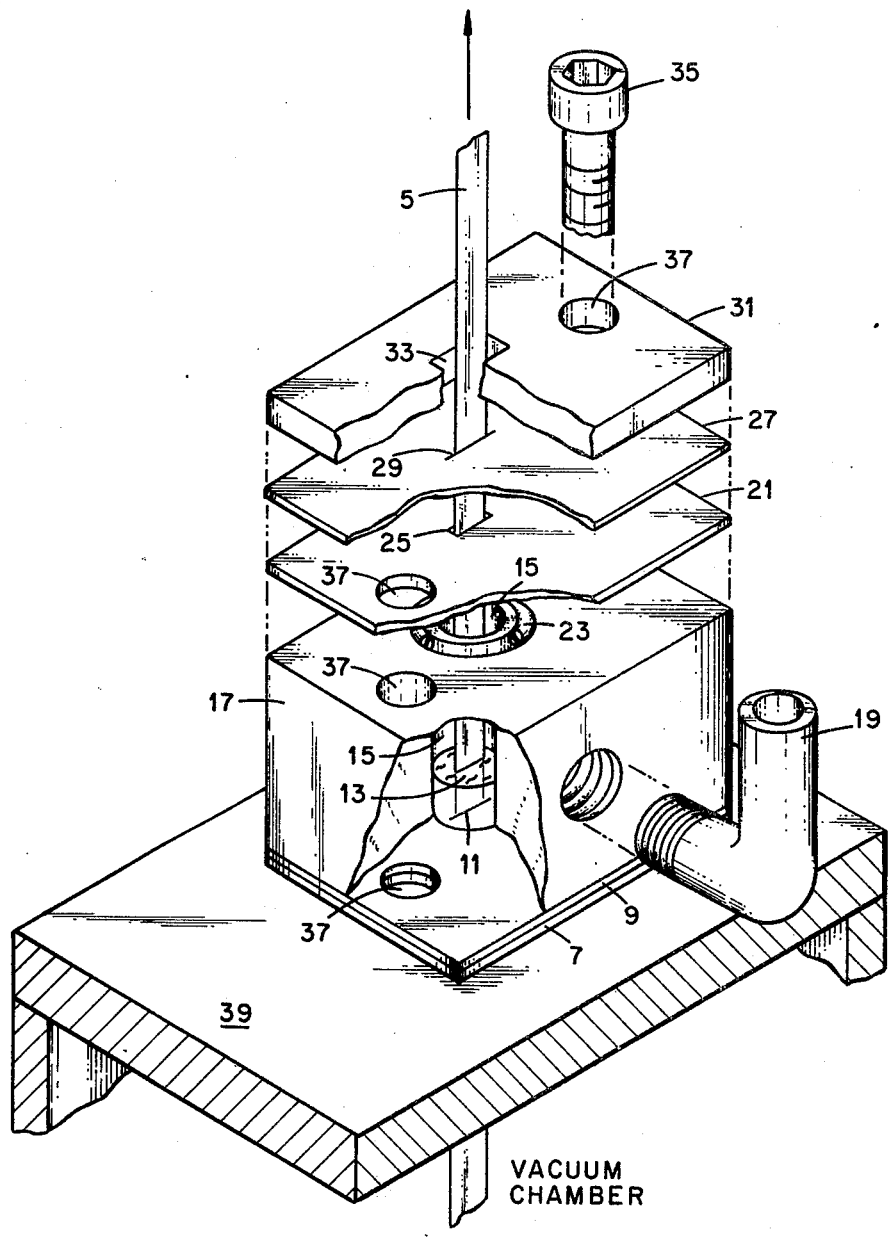

SEAL FOR PERMITTING TRANSFER OF TAPE FROM ONE PRESSURE REGION TO A REGION OF SUBSTANTIALLY DIFFERENT PRESSURE

This invention was made during the course of, or under, a contract with the Energy Research and Development Administration.

BACKGROUND OF THE INVENTION

This invention relates generally to pressure seals and more particularly to a sealing device for transfer of a thin tape between first and second regions of substantially different pressure.

At the University Isotope Separator at Oak Ridge, (UNISOR), a mass separator is on line with the Oak Ridge Isochronous Cyclotron (ORIC). The cyclotron beam impinges upon various targets in a vacuum system to produce small quantities of short half-life isotopes. At several stages of the operation it is necessary to either introduce or remove a sample into or from the vacuum system. The regular practice has been to either include the entire operation in a single vacuum system or move the samples through a vacuum lock. The first approach, that of a single vacuum system, has the disadvantages of being large and expensive. The second approach, that of utilizing a vacuum lock, has the disadvantages that a long time (greater than 30 seconds) is needed to remove samples, and unless great care is exercised, each time the vacuum lock is used a small amount of air enters the system which slowly contaminates it. Thus, there is a need for a sealing device in which samples may be readily removed from the vacuum system for evaluation without disturbing the collection of other isotopes in the vacuum chamber.

SUMMARY OF THE INVENTION

In view of the above need, it is an object of this invention to provide a pressure seal for permitting transfer of a thin tape between areas having a substantial difference in pressure.

Further, it is an object of this invention to provide a pressure seal according to the above object in which the tape is moved from a first pressure region into a second pressure region through a first elastomer seal into an intermediate pressure chamber containing a sealing fluid contacting said first elastomer seal and subsequently through a second elastomer member forming and sealing said intermediate pressure chamber from said second region.

Other objects and many of the attendant advantages of the present invention will be obvious from the following detailed description taken in conjunction with the drawing, wherein the single figure is an exploded, partially cut away isometric view, of a tape transport seal for high vacuum application constructed in accordance with the present invention.

DETAILED DESCRIPTION

A seal according to the present invention is shown in detail in the drawing for application in a system for transferring a tape 5 from a high vacuum region into the region of atmospheric pressure. Although the invention will be illustrated as applicable to a vacuum seal wherein the tape is drawn from a high vacuum system to a region of higher pressure, it will be understood that the seal may be designed for various applications other than the specific one illustrated here. For example, the seal may be useful in a situation where the tape is to be moved from a high pressure area into a low pressure region—the reverse of that shown here. In the illustrated situation, the tape is an aluminum-coated Mylar tape 5 (approximately 0.5 cm wide and 0.0038 cm. thick). The aluminum coating allows a charged beam to be monitored and also prevents charge buildup. Tapes of widths 0.5 cm. to 1.3 cm. have been used successfully in this sealing arrangement.

The tape 5 first passes from the vacuum system through a metal plate 7 in which is provided a narrow slit (not shown) for passage of the tape 5 therethrough from a vacuum chamber or the like. This slit is just wide enough to allow the tape to pass freely therethrough. Slits of widths 0.0127 cm. and 0.041 cm. have been used with equal success. The purpose of the metal plate 7 is to furnish support for a first elastomer seal 9 which is disposed just above the metal base plate 7. The elastomer seal 9, which may be formed of various materials, such as a butyl rubber sheet approximately 0.3 cm. thick, has a slitted opening 11 which is carefully cut with a sharp knife. A pool 13 of low vapor pressure fluid, such as vacuum pump oil, is placed in an intermediate chamber 15 formed within a housing 17. The housing 17 is provided with a vacuum port fitting 19 which communicates with the intermediate chamber 15 within the housing 17 for connection to a vacuum pump for maintaining the desired intermediate pressure in chamber 15.

The top portion of the seal includes a metal support plate 21 which seals against the top half of the housing 17 by means of an O-ring seal 23 provided about the upper portion of the chamber 15 opening. The support plate 21 has a narrow slit 25, identical to the slit in plate 7, which is not shown in the drawing, through which the tape 5 passes from the intermediate pressure chamber 15 through a second elastomer seal 27 which has a slitted opening 29 aligned with the slot 25 in plate 21. The slit 29 is formed in the same manner as the slit 11 in the similar elastomer seal member 9. To complete the structure, a pressure plate 31 is provided which fits over the upper elastomer member 27 and has a central opening 33 through which the tape 15 passes into the second or, in this case, the atmospheric pressure region.

The seal may be pressed together in various conventional ways. Typically, the seal is held together by means of bolts 35 (only one of which is shown) which extend through passageways 31 formed in the various parts of the seal to engage a threaded opening in the wall 39 of the vacuum chamber. In this case, an additional O-ring seal (not shown) is placed between the lower plate 7 and the vacuum chamber housing 39. The chamber wall 39 is provided with an opening through which the tape passes from the vacuum chamber into the intermediate chamber 15 through the slit 11 in seal 9. In the application as illustrated here, a small vacuum pump, not shown, of approximately 25 liters/minute capacity is used to provide the differential pressure in the chamber 15.

Typically, the tape is supplied from a reel mounted within the vacuum chamber. A test of the seal's effectiveness was made by continuously pulling the tape through the seal while observing pressure in the high vacuum chamber. The vacuum chamber had a volume of approximately 0.14 cubic meters and was pumped by a diffusion pump with an effective capacity of 950 liters/second. Initially, the pressure in the chamber was $6 \times 10^{-7}$ torr and while pulling the tape through the seal, the pressure rose no higher than $8 \times 10^{-7}$ torr, returning immediately to the original pressure when tape motion was stopped.

In some instances, it may be desirable to pull samples subject to smearing through the seal. In this case, a system may be provided wherein two tapes may be pulled through the seal back-to-back as one tape, with the sample residing between the two tapes.

This seal is very useful in other cases where short lived nuclei are encountered in experiments. These nuclei are produced by heavy ion beams and then transported via a helium gas flow to a low background area where the counting is done. Since the vacuum in the helium jet collection chamber is too poor to allow the use of cooled detectors in the chamber, the measurement of the internal conversion of electrons from short-lived sources has not been possible. By incorporating seals according to the present invention on either side of a high vacuum chamber, it will be possible to introduce the source directly from the helium jet collection chamber into a high vacuum chamber containing cooled detectors for counting.

Although this invention has been illustrated by way of a specific example, it will be understood that those skilled in the art may make various modifications and changes in the illustrated embodiment without departing from the spirit and scope of the invention as set forth in the claims attached to and forming a part of this specification.

What is claimed is:

1. A vacuum seal for permitting passage of an elongated flexible tape between a vacuum chamber and a region of substantially higher pressure comprising:
    a first elastomer sheet disposed over an opening in a wall of said vacuum chamber and having a slitted opening therethrough aligned with said opening in the wall of said vacuum chamber for allowing restricted passage of said elongated tape therethrough from said vacuum chamber;
    a housing having an inner opening therethrough forming an upright intermediate pressure chamber having its lower end formed and sealed by said first elastomer sheet, said chamber containing a low vapor pressure sealing liquid partially filling said intermediate pressure chamber and contacting said first elastomer member so that said elongated tape passes through said liquid entering said chamber through said opening in said first elastomer sheet;
    a second elastomer sheet forming the upper end of said intermediate pressure chamber and sealing said intermediate pressure chamber from said higher pressure region and having a slitted opening therethrough for restricted passage of said elongated tape from said intermediate pressure chamber into said higher pressure region; and
    clamping means for sealably clamping said elastomer sheets at opposite ends of said housing in a sandwiched arrangement against said vacuum chamber wall, thereby forming sealed enclosures of said intermediate chamber ends.

2. The vacuum seal as set forth in claim 1 wherein said low vapor pressure liquid is a vacuum pump oil.

* * * * *